INVENTOR.
GEORGE J. TOPOL
BY
Jeffers and Young
ATTORNEYS

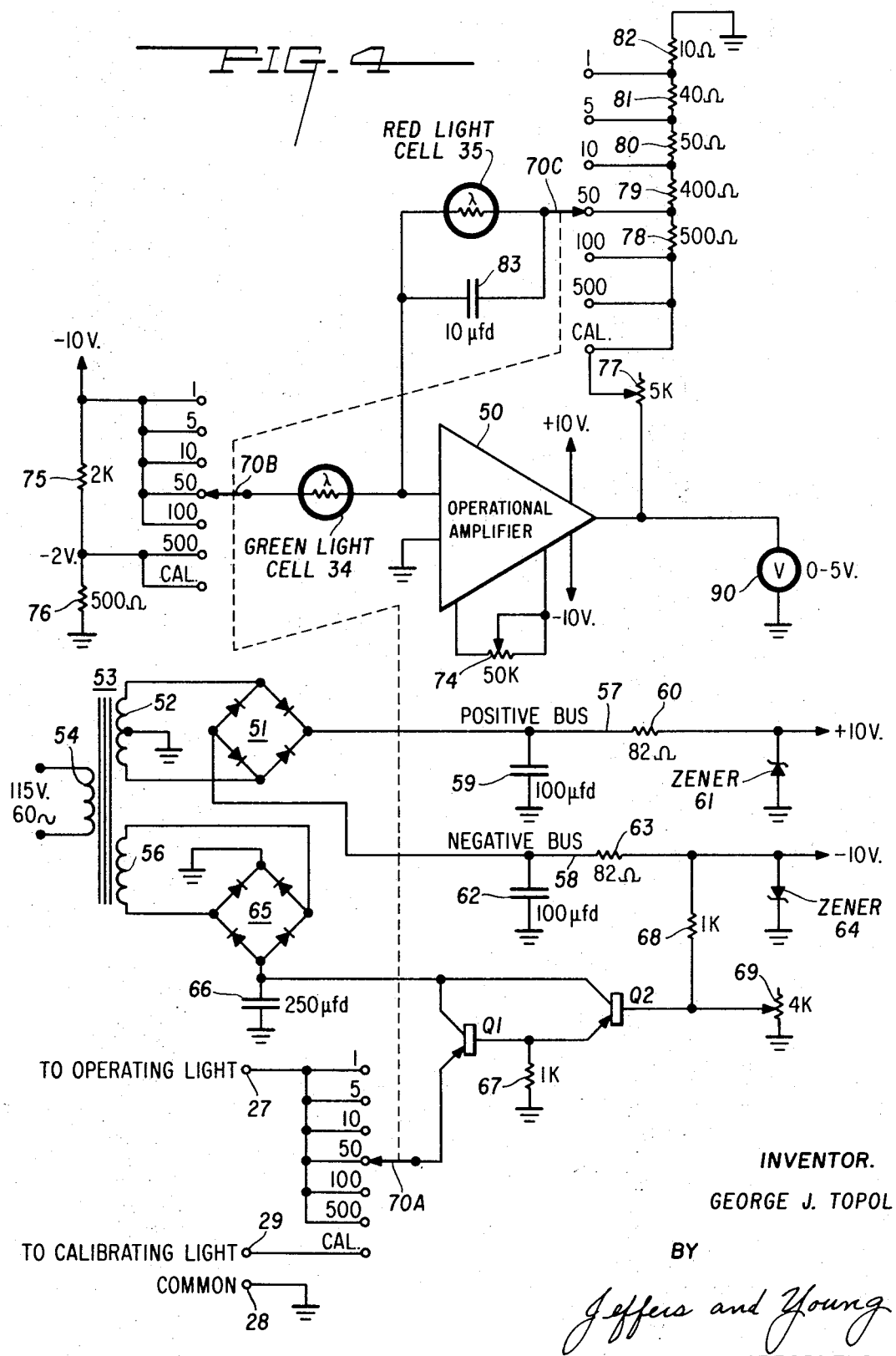

INVENTOR.
GEORGE J. TOPOL

BY
Jeffers and Young
ATTORNEYS 3,544,798
RADIATION SENSITIVE DEVICE FOR DETECTING
INTERFACE BETWEEN FLUIDS
George J. Topol, Reston, Va., assignor to Bowser, Inc.,
Fort Wayne, Ind., a corporation of Indiana
Filed Apr. 16, 1968, Ser. No. 721,790
Int. Cl. G01n 21/26
U.S. Cl. 250—218                       6 Claims

ABSTRACT OF THE DISCLOSURE

An interface detector has a visible light source and two light sensitive devices positioned to receive light from the light source that passes through a liquid being detected. A green light filter is positioned between the first light sensitive device and the light source, and a red light filter is positioned between the second light sensitive device and the light source. An electrical circuit is coupled to the light sensitive devices for indicating the ratio of the electrical signals produced by the light sensitive devices. A transition from one liquid to another causes the indicated ratio to change, thus indicating an interface.

BACKGROUND OF THE INVENTION

My invention relates to an interface detector, and particularly to an improved interface detector that provides an electrical indication in response to the transition from a first liquid flowing in a line to a second liquid flowing in the line.

Pipe lines are used extensively to transport or convey liquids from one location to another, and a single pipe line is frequently used to convey more than one liquid. For example, several grades or octane ratings of gasoline may be produced at an oil refinery and conveyed in a desired sequence from the refinery to a distribution or location or storage tank. In such an example, a first grade of gasoline may first be conveyed through the pipe line, and then a second grade of gasoline may be conveyed through the pipe line right behind the first gasoline. In order that each grade of gasoline can be directed to the proper location or storage tank, it is necessary to detect or know when the first grade of gasoline stops and the second and different grade of gasoline begins. When the second grade of gasoline arrives behind the first grade of gasoline, appropriate valves must be operated to direct the second grade of gasoline to its proper storage tank.

Accordingly, an object of my invention is to provide an improved device for detecting the transition between two liquids or gases flowing in a pipe or container.

Another object of my invention is to provide an improved device for detecting when a first liquid stops flowing and a second liquid starts flowing.

The transition between two gasolines (or two liquids) is called an interface. As the total distance of liquid conveyance increases, the transition becomes more gradual or spread out, since the two liquids have a greater opportunity to become mixed at their interface. Generally, because of this gradual transition, a considerable quantity of the higher grade of gasoline is conveyed to the location or storage tank of the lower grade of gasoline to insure that the higher grade of gasoline is not diluted with the lower grade of gasoline. In other words, if a pipe line has been carrying a higher grade of gasoline to its storage tank, then a valve is operated to carry the gasoline to the storage tank for the lower grade of gasoline well in advance of the lower grade of gasoline flowing past the valve. Or, if a pipe line has been carrying a lower grade of gasoline to its storage tank, then a valve is operated to carry the higher grade of gasoline to the storage tank for the higher grade of gasoline well after the higher grade of gasoline flows past the valve. While this procedure assures that the higher grade of gasoline is not diluted with the lower grade of gasoline, it may result in an excessive amount of higher grade gasoline being mixed into the lower grade of gasoline. While the ultimate consumer may benefit from such a mixture, oil companies and operators may lose appreciable revenue because of the higher grade gasoline being mixed with the lower grade of gasoline. This is particularly true, as previously mentioned, where the transition is relatively long.

Accordingly, another object of my invention is to provide an improved interface detector which senses the color of a flowing liquid and indicates changes in the color of the liquid.

Another object of my invention is to provide an improved interface detector for detecting changes in color of a liquid or gas flowing past the detector, and for providing a reliable indication of a color transition or interface in the liquid or gas.

Another object of my invention is to provide an improved interface detector that is sensitive to changes in the color of a liquid so that two different liquids flowing in sequence may be kept as well separated as possible.

SUMMARY OF THE INVENTION

Briefly, these and other objects are achieved in accordance with my invention by a housing which is adapted to be positioned in the system conveying or carrying the liquid. A light source is mounted on the housing to provide light within the housing. First and second light sensitive devices are mounted on the housing to receive light from the source that passes through the liquid in the housing. First and second filters are respectively positioned in front of the first and second light sensitive devices to filter light from the light source that passes through the liquid in the housing and that is received by the first and second light sensitive devices. These first and second light filters have characteristics such that the wave lengths of light passed by the first and second filters are different. Means are connected to the first and second light sensitive devices for deriving first and second electrical signals. These first and second electrical signals are combined as a ratio that indicates the color, and hence the type, of liquid passing through the housing.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

3

Figure 3:
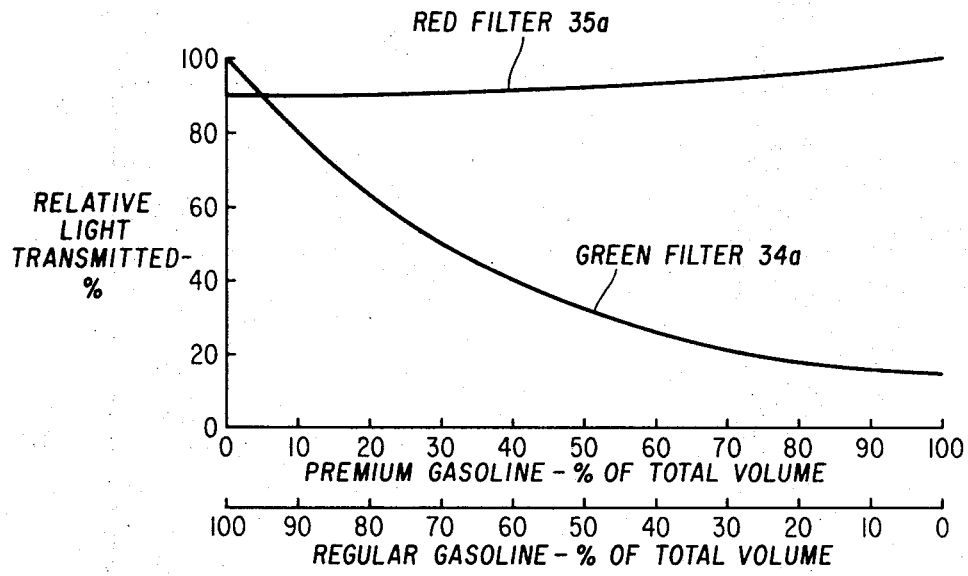
Figure 5:
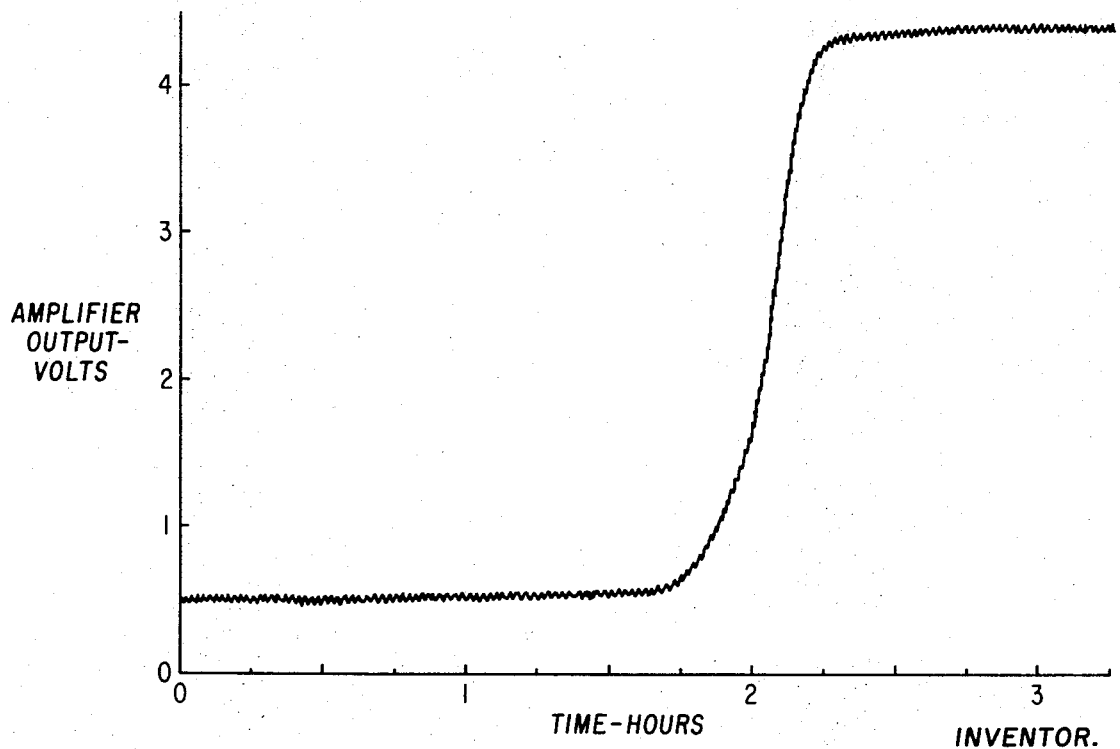

FIG. 3 shows relative light transmitting characteristics obtained for use in the design of my interface detector for two grades of gasoline;

FIG. 4 shows an electrical circuit for providing a ratio of the electrical signals produced by my interface detector; and FIG. 5 shows an electrical output, as a function of time, produced by the electrical circuit of FIG. 4 and my interface detector in one application or installation.

DESCRIPTION OF THE PREFERRED EMBODIMENT

Figure 1:
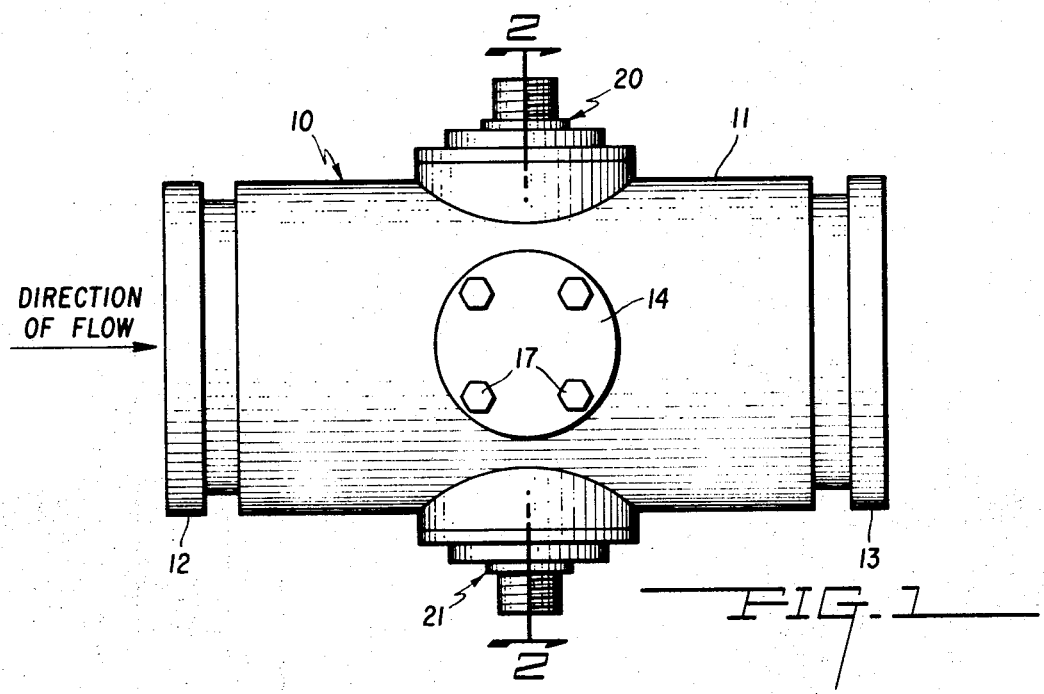
FIG. 1 shows a housing containing one embodiment of an interface detector in accordance with my invention.
Figure 2:
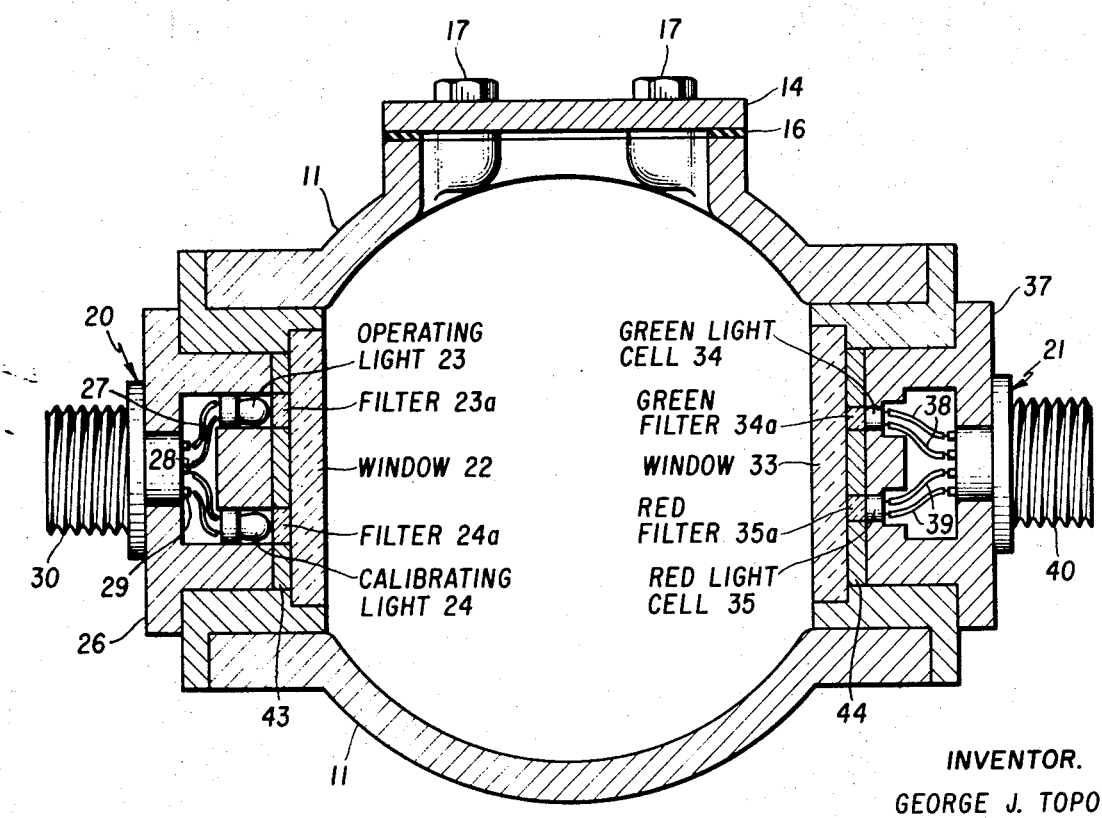
FIG. 2 shows a cross sectional view of the housing and detector taken along the line 2—2 in FIG. 1.

FIG. 1 shows a plan view of an interface detector housing 10 incorporating my invention. In the embodiment to be described, it has been assumed that the fluids whose interface is to be detected is a liquid that flows in a cylindrical pipe in the direction of flow indicated by the arrow in FIG. 1. Consequently, for this assumed example, the housing 10 is provided with a cylindrical member 11 having flanged ends 12, 13 for connection into the pipe carrying the liquid. It is to be understood that members of other shapes can be substituted for the cylindrical member 11. The cylindrical member 11 is provided with an opening in its top, and an access plate 14 is positioned over this opening to provide a liquid-tight connection. The access plate 14 may be provided with a gasket 16, and is attached to the member 11 in any suitable manner, as by bolts 17. Although not absolutely necessary, I have found that the access plate 14 is desirable in order to provide access to the interior of the housing 10. At the same longitudinal point along the member 11, two electrical connecting members or elements 20, 21 are provided. As seen best in FIG. 2, which is an enlarged cross sectional view taken along the line 2—2 in FIG. 1, the electrical connecting members 20, 21 are positioned approximately 90 degrees around the circumference of the member from the access plate 14. Thus, the electrical connecting members 20, 21 are positioned substantially diametrically opposite each other.

Optical access to the interior of the cylindrical member 11 is provided by a transparent window 22 which is made of glass or plastic, and which is positioned in an opening in the member 11 and sealed with a water-tight connection. The window 22 preferably has light transmitting characteristics such that it transmits the spectrum of light between the infrared wave lengths and the violet wave lengths inclusive. An operating light 23 and a calibrating light 24 are positioned behind or outside of the window 22, and mounted in respective holes or recesses in a cover piece 26. An operating light filter 23a is positioned between the operating light 23 and the window 22, and a calibrating light filter 24a is positioned between the calibrating light 24 and the window 22. The two filters 23a, 24a may be mounted in a filter holder 43 made of any suitable material such as metal. The filter 23a preferably has light transmitting characteristics such that it blocks the infrared portion of the light spectrum and passes the visible portion of the light spectrum. The filter 24a preferably has light transmitting characteristics such that it passes the infrared portion of the light spectrum and blocks the visible portion of the light spectrum. The reasons for these filters 23a, 24a and for these characteristics will be explained subsequently. Electrical leads or connections for the lights 23, 24 are provided and brought out through any suitable type of connection member 30 for connection to an indicating or meter circuit. These leads include an operating light lead 27, a common lead 28, and a calibrating light lead 29.

On the other side of the cylindrical member 11, a transparent window 33 is positioned in an opening in the member 11, and sealed with a water-tight connection. The window 33 is also glass or plastic, and has light transmitting characteristics such that it can pass the light spectrum between the infrared and violet wave lengths inclusive. Operating light sensitive devices or cells 34, 35 are positioned behind or outside the window 33. The light cells 34, 35 may be any suitable light sensitive device as long as they respond to the visible portion of the light spectrum for operation, and respond to the infrared portion of the light spectrum for calibration. I prefer light sensitive devices whose impedance or direct current resistance varies inversely with the amount of light received. Or, expressed in another way, the conductances of the light cells 34, 35 vary as a function of the amount of light received. If more light is received, the conductance of the cells 34, 35 increases. The cells 34, 35 are shielded from each other by being mounted in respective holes or recesses in a cover piece 37. A light filter 34a is positioned between the light cell 34 and the window 33, and a light filter 35a is positioned between the light cell 35 and the window 33. The two filters 34a, 35a may also be mounted in a filter holder 44 of any suitable material such as metal. The filter 34a preferably has light transmitting characteristics such that it passes only the green portion of the visible light spectrum and the infrared portion of the light spectrum. The filter 35a preferably has light transmitting characteristics such that it passes only the red portion of the visible light spectrum and the infrared portion of the light spectrum. The reasons for the filters 34a, 35a and for these characteristics will be explained subsequently. Leads 38 for the green light cell 34 and leads 39 for the red light cell 35 are brought out through an electrical connection member 40 for connection to the meter or indicating circuit.

The procedure for selecting the light transmitting characteristics of the operating light filter 23a the calibrating, light filter 24a, the green filter 34a, and the red filter 35a will be explained in connection with a specific application. This specific application is given by way of example only, and it is to be understood that other applications may require different filters to achieve a suitable detection of an interface in accordance with my invention. In the specific application, it was desired to detect the interface between premium gasoline and regular gasoline flowing in sequence in a pipe line or other conveyor. The premium gasoline and the regular gasoline are colored by a suitable dye so that they can be visibly recognized and distinguished. FIG. 3 shows the light transmitting characteristics of various percentages by volume of this premium gasoline and regular gasoline. These light transmitting characteristics are shown for light passing through the various ratios of premium and regular gasoline and through two different light filters, namely: a red filter and a green filter. In FIG. 3, it will be seen that when only regular gasoline is present (that is, 100 percent by volume of regular gasoline), the gasoline and the red filter transmit about 90 percent as much light as when only premium gasoline is present (that is, 100 percent by volume of premium gasoline). When only premium gasoline is present, the gasoline and the green filter transmit about 15 percent as much light as when only regular gasoline is present. While only a single light cell with a red or green filter could be used to detect the transition between regular and premium gasolines, by using both filters two advantages may be gained: greater indication and freedom from spurious indications. First, the two filters 34a, 35a have opposite transmittance characteristics for the two gasolines. Thus, by using their ratio, the two characteristics are effectively multiplied: the ratio of red to green changes from about 0.9 for regular gasoline to about 7 for premium gasoline. The change in ratios from regular to premium gasoline is 7/0.9 or about 8:1. Second, the ratio method is immune to changes in the amount of light which the light source emits and it is immune to effects caused by turbidity, air bubbles, and debris in the liquids. Any of these effects change the amount of light which is received by the light sensitive devices. This loss of light, however, is proportionally the same for both the red and green light sensitive devices, so that their ratio is undisturbed. By indicating only the ratio of green to red light, and ignoring the absolute amounts of red and green light which are transmitted through the gasoline, these effects are effectively cancelled out.

This ratio can be indicated by a number of electrical circuits, such as the circuit of FIG. 4. The components for this circuit have their values indicated. Power for the circuit, in this case direct current of +10 volts and −10 volts, is provided by a bridge rectifier 51 having its input terminals connected to the secondary winding 52 of a transformer 53. The center tap of the secondary winding 52 is connected to a point of reference potential or ground. The primary winding 54 of the transformer 53 is connected to a suitable source of power, in this case 115 volts, 60 cycles. The output terminals of the bridge rectifier 51 are connected to a positive bus 57 and a negative bus 58. The positive bus 57 is provided with a filter capacitor 59 and a resistor 60. The +10 volts is regulated by a Zener diode or rectifier 61 Like.wise, the negative bus 58 is provided with a filter capacitor 62 and resistor 63 and is regulated with a Zener diode or rectifier 64. The +10 volts and −10 volts are connected to the circuit at the various points indicated. The power supply also provides a regulated current for the operating light 23 and the calibrating light 24. This regulated current is provided by a bridge rectifier 65 having its input terminals connected to a secondary winding 56 of the transformer 53. One of the output terminals of the bridge rectifier 65 is connected to the point of reference potential or ground. The other output terminal of the bridge rectifier 65 is connected to one side of a filter capacitor 66 and is, also connected to the collectors of the two PNP type transistors Q1 and Q2. The transistor Q1 provides the current path for the lights, and has its emitter connected to a movable arm 70A of a multisection switch. The arm 70A has seven contacts. The first six contacts are connected through the lead 27 to the operating light, and the seventh contact is connected through the lead 29 to the calibrating light. The common lead 28 for the lights is also shown. The switch includes two other sections having arms 70B and 70C, each of which has seven associated contacts. The arms 70A, 70B, and 70C operate together on a common shaft as indicated by the dashed lines. The base of the transistor Q1 is coupled through a resistor 67 to ground, and is also coupled to the emitter of the transistor Q2. The base of the transistor Q2 is coupled through a resistor 68 to the −10 volt bus and is also coupled through a potentiometer 69 to ground. The setting of the potentiometer 69 determines the base voltage for the transistor Q2. Since both transistors Q1 and Q2 act as emitter followers, the setting of the potentiometer 69 determines the voltage supplied to the operating light 23 or the calibrating light 24.

In the upper portion of my circuit, a conventional operational amplifier 50 is provided and connected to the +10 volts and −10 volts as indicated. A balance potentiometer 74 is connected to the operational amplifier 50. One input terminal of the operational amplifier 50 is connected to ground, and the other input terminal of the amplifier 50 is connected to one terminal of the green light cell 34. (The green light cell 34 and the red light cell 35 are indicated by a resistor and the symbol lambda.) The other terminal of the green light cell 34 is connected to the arm 70B of the switch. The first five contacts associated with the arm 70B are connected to the −10 volts, and the sixth and seventh contacts are connected to the junction of a voltage divider network comprising two resistors 75, 76 connected between −10 volts and ground. The output terminal of the operational amplifier 50 is coupled through a calibrating potentiometer 77. The movable arm of this potentiometer 77 is connected to the fifth, sixth and seventh contacts associated with the arm 70C of the ganged switch. A voltage divider network comprising five resistors 78, 79, 80, 81, 82 is connected between the arm of the potentiometer 77 and ground. The first four contacts associated with the arm 70C are connected to the junctions between adjacent pairs of the resistors 78, 79, 80, 81, 82. The movable arm 70C is connected through the red light cell 35 to the input terminal of the amplifier 50. The red light cell 35 is supplied with a bypass capacitor 83.

As is known in the art, the operational amplifier 50 functions so that the following relation is provided:

$$e_o = -e_i \frac{G_i}{G_f} \qquad (1)$$

In Equation 1, $e_o$ is the output voltage of the amplifier 50, $e_i$ is the input voltage of the amplifier 50, $G_i$ is the input conductance connected to the input of the operational amplifier 50, and $G_f$ is the feedback conductance connected between the output and the input of the operational amplifier. With respect to FIG. 4, the input conductance $G_i$ is actually the conductance of the green light cell 34. In Equation 1, $G_i$ can be replaced by $G_G$, which is the conductance of the green light cell 34. The effective feedback conductance $G_f$ of Equation 1 can, by reference to FIG. 4, be replaced by the conductance $G_R$ of the red light cell 35, multiplied by the portion of the output voltage $e_o$ appearing at the arm 70C of the switch. This portion of the output voltage $e_o$ is determined by the position of the arm 70C of the switch and by the setting of the calibration potentiometer 77. If K represents the ratio of the feedback voltage appearing on the arm 70C divided by the output voltage $e_o$, Equation 1 can be rewritten as follows:

$$e_o = -e_i \frac{G_G}{G_R K} \qquad (2)$$

From Equation 2, it will be observed that the conductivity $G_G$ of the green light cell 34 is divided by the conductivity $G_R$ of the red light cell 35. Thus, the circuit of FIG. 4 provides the division of the two conductivities, so that the output voltage varies as the ratio of the conductivity $G_G$ of the green light cell 34 to the conductivity $G_R$ of the red light cell 35. This output voltage can be indicated by a voltmeter 90 connected between the output of the amplifier 50 and ground. From FIG. 3, it will be seen that the amount of transmitted light and hence the conductivity $G_R$ of the red light cell 35 increase as the amount of premium gasoline increases; and that the amount of transmitted light and hence the conductivity $G_G$ of the green light cell 34 decrease as the amount of premium gasoline increases. The reverse takes place as the amount of regular gasoline increases. Hence, in order that the voltmeter 90 connected to the output of the amplifier 50 may be kept on scale, the feedback conductivity ($G_R K$) is varied through the factor K. This is achieved by the movable arm 70C which can engage a selected contact. In FIG. 4, the contacts associated with each of the movable arms 70A, 70B, and 70C have been labeled in Jackson Turbidity Units (which indicate the turbidity of the liquid), although any suitable units can be used. With the arm 70C (and the other two arms 70A and 70B) engaging the uppermost contact, the range of JTU's is from 0 to 1. Thus, the feedback voltage is determined by a voltage divider consisting of a resistor 82 (10 ohms) on one side and the sum of the resistors 81, 80, 79, 78, and the resistance of the potentiometer 77 on the other side. Since the resistor 82 is very small compared to the remaining resistors in series, the feedback voltage of the arm 70C and the ratio K are low. This results, according to Equation 2, in highest output (sensitivity). With the arm 70C engaging the contact for 50 JTU's, as shown in FIG. 4, the resistance on one side of the divider consists of a series resistance of the resistors 82, 81, 80, and 79, while the total resistance of the voltage divider remains the same as before. The combined resistance of resistors 82, 81, 80, and 79 amounts to 500 ohms which is 50 times higher than in the case of 1 JTU setting. As a result, the sensitivity is reduced by a factor of 50. Thus, the resistors 78, 79, 80, 81, 82 enable the same voltmeter 90 to be used over a wide range of turbidities or other conditions. And, the circuit of FIG. 4 achieves the division of green light conductivity by red light conductivity, and provides a linear indication of this conductivity ratio over a wide range of conditions.

The interface detector described in connection with FIGS. 1, 2, 3, and 4 was actually used on a pipe line carrying premium gasoline and regular gasoline with an interface transition. This detection was made at the end of a pipe line which was approximately 60 miles long, and in which premium gasoline had first been piped, followed by a change to regular gasoline. FIG. 5 shows the output obtained from the operational amplifier 50 with respect to time. While premium gasoline was present for approximately one hour and forty-five minutes, a relatively low output of 0.5 volt was obtained. This is because, as will be seen from FIG. 3, the green light cell 34 receives a small amount of light and the red light cell 35 receives a large amount of light, so that their conductivity ratio $G_G/G_R$ is small. After approximately one hour and forty-five minutes, the transition from premium to regular gasoline began, and it will be seen how the amplifier output voltage increases sharply to approximately 4.25 volts over a relatively short time period of about one half hour. The amplifier output voltage stabilized at approximately 4.3 volts. Reference to FIG. 3 will show that with only regular gasoline present, the green light cell 34 receives a large amount of light and the red light cell 35 receives a small amount of light, so that their conductivity ratio $G_G/G_R$ is large. Thus, a clear and relatively sharp indication of an interface between the two gasolines was indicated.

In order to calibrate the interface detector, it would normally be desirable to remove all liquid or other material from the housing 10 so that the green and red light cells 34, 35 could be supplied with equal amounts of light. However, in an operating system, such as a gasoline pipe line, this is impractical. Since most gasolines use dyes which are practically transparent to infrared light, I provided the infrared filter 24a in front of the calibrating light 24. This selection of infrared was made because I found that both the regular and premium gasolines transmitted infrared light about the same, and because both the green and red filters 34a, 35a transmitted infrared light about the same. When my interface detector is calibrated, the arms 70A, 70B, 70C of the switch of FIG. 4 are connected to the calibration contact to energize the calibrating light 24. The calibrating light 24 and its filter 24a provide infrared light to both light cells 34, 35. The cells 34, 35 receive substantially equal amounts of infrared light so that their conductances are approximately equal. The operational amplifier 50 may then be calibrated by adjusting the calibration potentiometer 77 until the voltmeter 90 reads some predetermined reference value. This is an important feature of my invention. Most electric, electronic, and photoelectronic devices tend to change with age, temperature, or other factors. The inclusion of a calibration circuit allows the operator to check the entire circuit periodically and to compensate for such changes if necessary. A major advantage of my calibration arrangement is that the reading obtained on the voltmeter 90 when the calibrating light 24 is used is not affected by the color of the liquid. This calibration value is arbitrarily determined so that neither premium nor regular gasolines cause the voltmeter 90 to exceed the full scale value when the selector switch is set to 500. After the detector is calibrated, the switch arms 70A, 70B, 70C may be positioned at the desired sensitivity level. Since the green and red filters 34a, 35a pass infrared light with very little attenuation, it is desirable to put the infrared filter 23a in front of the operating light 23. This filer 23a should pass substantially all of the visible portion of the light spectrum and sharply attenuate the infrared portion of the light spectrum during operation. If the green and red light cells 34, 35 were to receive infrared light in addition to visible light during operation, they would be less sensitive to changes in the liquid being detected.

It will thus be seen that my invention provides a new and improved interface detector which permits the transition between two fluids, such as a gas or a liquid in a pipe line, to be clearly and reliably detected. While I have shown only one embodiment of my detector, persons skilled in the art will appreciate that modifications may be made. For example, other circuits may be provided for taking the ratio of the conductances of the two light cells. Also, this ratio may be inverted if the characteristics of the fluid being detected and the light cells result in a greater change by inverting the ratio. The calibration arrangement may be omitted. And, light filters having different passband characteristics may be provided, depending upon the particular color of the gas or liquid being detected. It is also possible to use special types of light sources and photocells which have desired spectral characteristics instead of the filters. Therefore, while my invention has been described with reference to a particular embodiment, it is to be understood that modifications may be made without departing from the spirit of the invention or from the scope of the claims.

What I claim as new and desire to secure by Letters Patent of the United States is:

1. For use in a system conveying fluids, a device for detecting the transition between a first fluid passing a location in said system and a second fluid passing said location in said system, said device comprising:
   (a) a housing through which said fluid passes, said housing being adapted to be positioned at said system location;
   (b) a light source mounted on said housing to provide light in said housing;
   (c) first and second light sensitive devices mounted on said housing to receive light from said light source that passes through fluid in said housing;
   (d) first and second light filters respectively positioned in front of said first and second light sensitive devices to filter light from said light source that passes through fluid in said housing and that is received by said first and second light sensitive devices;
   (e) said first and second light filters having characteristics such that different wave lengths of light are passed by said first and second light filters;
   (f) means coupled to said first and second light sensitive devices for deriving electrical indications therefrom; and
   (g) means coupled to said deriving means for producing a ratio of said electrical indications and providing an output indicative of said ratio.

2. An improved interface detector for liquids and the like flowing in a system past a location, comprising:
   (a) a detector housing adapted to be positioned in said system at said location;
   (b) a first source of light mounted on one side of said housing for directing light toward the other side of said housing;
   (c) first and second light sensitive devices mounted on said other side of said housing for receiving light from said source that passes through the interior of said housing;
   (d) a first light filter positioned between said first light source and said first light sensitive device;
   (e) a second light filter positioned between said first light source and said second light sensitive device;
   (f) said first and second light filters having different passband characteristics in the visible light spectrum;
   (g) means coupled to said first and second light sensitive devices for respectively deriving first and second electrical signals therefrom;
   (h) and means coupled to said deriving means for combining said first and second electrical signals as a ratio and producing an output electrical signal that varies as a function of said ratio.

3. The improved detector of claim 2 wherein said first source of light is predominantly in the visible part of the light spectrum.

4. The improved detector of claim 3 wherein said first light filter has a predominant passband in the green portion of the visible light spectrum and said second light filter has a predominant passband in the red portion of the visible light spectrum.

5. The improved detector of claim 4 and further comprising a second source of light mounted on said housing for directing light toward said other side of said housing, said second source of light being predominantly in the infrared portion of the light spectrum, and wherein said first and second sources of light are selectively operable for operating said detector and for calibrating said detector.

6. A device for monitoring the interface between two liquids in a liquid stream whose indication is dependent on the color differences between these liquids, and independent of the concentration of particulate contamination within these liquids, and capable of being calibrated to a constant value without interrupting the liquid stream comprising:
  (a) a light source to illuminate a section of the liquid stream with substantially infrared free visible light;
  (b) a second light source to illuminate said section of the liquid stream with substantially visible free infrared light;
  (c) a first photodetector positioned so as to receive light from said first and second light sources through the liquid, and covered with a first light filter that passes infrared light and a selected portion of the visible specrum;
  (d) a second photodetector positioned so as to receive light from said first and second light sources through the liquid, and covered with a second light filter that passes infrared light and a selected portion of the visible spectrum different from that of the first said light filter;
  (e) an electronic circuit connected to said first and second photodetectors so as to indicate the ratio of their photocurrents; and
  (f) means for selecting one of said first light source for operation and said second light source for calibration.

References Cited

UNITED STATES PATENTS

| | | | |
|---|---|---|---|
| 2,721,942 | 10/1955 | Friel et al. | 250—218 X |
| 2,727,997 | 12/1955 | Schofield | 250—218 |
| 3,062,963 | 11/1962 | Douty | 250—226X |

WALTER STOLWEIN, Primary Examiner

U.S. Cl. X.R.

356—181